May 25, 1937.    R. P. BREESE    2,081,527
GEAR SHIFTING MECHANISM
Filed Aug. 25, 1933
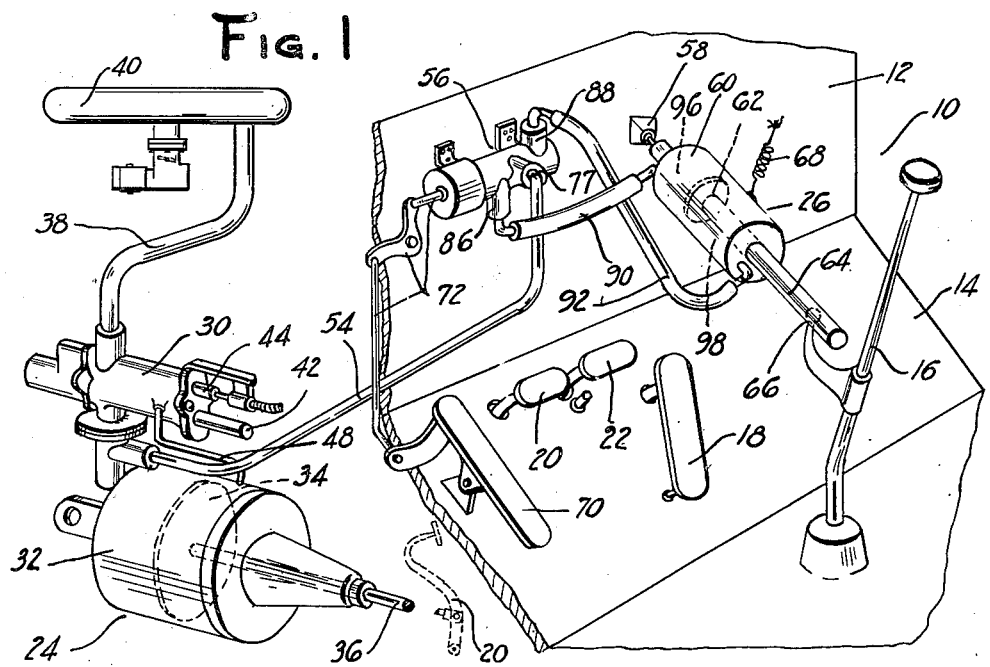
INVENTOR.
ROBERT P. BREESE
BY
H. O. Clayton
ATTORNEY.

Patented May 25, 1937

2,081,527

UNITED STATES PATENT OFFICE 2,081,527

GEAR SHIFTING MECHANISM

Robert P. Breese, South Bend, Ind., assignor to Bendix Aviation Corporation, South Bend, Ind., a corporation of Delaware Application August 25, 1933, Serial No. 686,723

7 Claims. (Cl. 192—3.5)

This invention relates in general to means for controlling the operation of an automotive vehicle and more particularly to means correlating the control of the internal-combustion engine, the clutch and the change-speed transmission to simplify the technic of operation of these units, minimize the physical effort necessary to their operation and in general provide a simple and effective mechanism for the purposes intended.

The trend in the present day automotive vehicle is to power operation of the controls of the power plant; also, to reducing the number and complexity of the controls. It is accordingly the principal object of the invention to provide simply controlled pressure differential operated power means for operating the standard types of clutch and transmission with which the vehicle is equipped, said means to be in part controlled by the means for operating the throttle of the engine. With the present invention the control of the clutch is entirely dispensed with and the control of the transmission is limited to a simple form of manually operated selector.

The invention also contemplates the provision of interlocking clutch and transmission operating power means, preferably of the manifold vacuum operated type, controlled in part by the accelerator pedal of the vehicle and in part by a left-foot operated selector, the arrangement being such that the transmission may be operated only after the accelerator is released and the clutch disengaged.

With respect to the power operation of the transmission of an automotive vehicle the prior art is replete with suggestions of so-called built-in mechanisms for operating the gear train of the transmission. Such mechanisms are, however, necessarily complicated and expensive, usually requiring a modification of the standard form of transmission and including numerous conduits, valves, cylinders, etc. The invention is accordingly specifically directed to a power means for operating the transmission, the object being to provide a very simple and economical form of accessory unit adapted to operate the present day type of transmission including a conventional gear shift lever, the power element of the unit being preferably connected directly to the shift lever. To this end there is suggested a pivotally mounted pressure differential operated actuator operably connected to the shift lever at a point above the floor board and within the driver's compartment, said actuator being selectively operable to move the shift lever to any one of its operative positions.

It is a further object of the invention to so construct the actuator as to permit of unimpeded manual operation of the shift lever to any one of its operative positions when the actuator is de-energized.

A further object of the invention is to provide power means for operating the shift lever to successively select either the second or high gear ratios of the transmission, the low or reverse selections being preferably, but not necessarily, effected manually. To this end there is provided a double acting actuator operably connected to the lever and controlled by a two-way operated valve mechanism providing two separate three-way valves to selectively operate the actuator to effect the desired shift.

As a further feature of the invention the aforementioned valve mechanism is so designed as to automatically return to a neutral position with release of the valve operating mechanism and thereby de-energize the actuator and leave the shift lever in its operative position.

Yet another feature of the invention lies in the provision of yielding means normally biasing the aforementioned actuator and its connected shift lever to a position to operate the second and high gear shifter rod of the transmission, said yielding means to be overcome in order to effect an operation of the remaining shifter rod.

Other objects of the invention including desirable details of construction and combinations of parts will readily suggest themselves to those skilled in this art and will be apparent from the following description and claims when considered together with the accompanying drawing, in which:

Figure 1 is a diagrammatic view disclosing the elements of the power gear shift mechanism constituting the invention;

Figure 2 is a sectional view of the selector valve mechanism for controlling the operation of the actuator of the invention, and Figure 3 is a detail view of the double clutch actuator and the controls therefor.

The present invention in its broadest aspect is directed to power means for operating the standard types of clutch and transmission of an automotive vehicle, said power means being controlled in part by the throttle operated means of the internal combustion engine. In that embodiment of the invention selected for illustration there is shown in Figure 1 a driver's compartment 10 outlined in part by a dash 12 and a toeboard 14 and housing a conventional transmission shift lever 16, accelerator pedal 18 and clutch and brake pedals 20 and 22.

Both the clutch and the transmission are preferably power operated by manifold vacuum operated double ended actuators 24 and 26 operatively connected respectively to the clutch pedal 20 and shift lever 16. The principal elements of the clutch actuator and its control valve mechanism 30 are shown in detail in Figure 3 wherein a double ended cylinder 32 houses a reciprocal piston element 34, operatively connected to the clutch pedal by a link 36. A conduit 38 interconnects an engine manifold 40, providing a source of vacuum power, with one end of the cylinder 32, the valve mechanism 30, comprising a combined three-way cut-out and bleed valve unit, being incorporated in the connection to control the operation of the clutch motor. A combined three-way and bleed plunger 42 of the valve unit is preferably connected to the accelerator pedal 18. A three-way valve plunger 44, preferably operated from the dash, serves as a cut-out means for rendering the clutch and transmission power means inoperative. In this operation with movement of the plunger a recess 44' therein is moved out of registry with the conduit 38, and further movement of the plunger permanently vents the actuator 24 to the atmosphere via a slot 44'' in the plunger. The plunger 42 is recessed at 45 to interconnect the manifold and clutch motor to disengage the clutch when the accelerator is released. When the accelerator is operated to speed up the engine the plunger 42 is moved to the left to cut off the connection with the vacuum and vent the motor to atmosphere via a slot 46 in the plunger. The engaging operation of the clutch is thus initiated, the control of the engagement being effected by regulating the rate of efflux of air from the motor via a conduit 48 tapped into the casing of the valve unit 30, the air then escaping through a tapered slot 50 in the plunger 42. A slot 52 is provided in the rod 36 permitting a relatively rapid efflux of air from the motor during the first portion of the clutch engaging throw of the clutch pedal, the last stage of the throw being relatively slow by virtue of the relatively slow bleed of air via the slot 50.

The details of the aforementioned clutch operated mechanism form no part of the instant invention, being more fully described and claimed in an application of Victor W. Kliesrath No. 592,170, filed February 10, 1932.

The shift lever operating actuator 26 constituting the essence of the present invention is also connected to the manifold by a conduit 54, said conduit being tapped into the aforementioned conduit 38 at a point between the valve unit 30 and the clutch actuator 24. The three-way valve plunger 42 thus serves as a control valve for both the actuators 24 and 26, the remaining control valve mechanism for the shift lever comprising a manually operated selector valve mechanism 56 described in detail hereinafter.

The aforementioned connection of the conduit 54 into the conduit 38 and below the valve unit 30 is an important feature of the invention inasmuch as the accelerator pedal must be released to operate the three-way valve plunger 42 to interconnect the manifold with the clutch and shift lever motors before the latter may be energized. Thus the clutch is automatically disengaged with release of the accelerator and furthermore the shift lever may not be operated until the clutch is disengaged.

The accelerator pedal, therefore, becomes a common control means for (1) idling the engine to create a source of vacuum power and (2) as a means for operating a common control valve for both the transmission and clutch actuators.

Passing now to a more detailed description of the power means for operating the shift lever of the transmission the actuator 26 is preferably mounted to swivel in a horizontal plane, the mounting comprising a ball and socket universal joint 58 secured to the dash 12, all as shown in Figure 1. The actuator is preferably made up of a double ended cylinder 60 housing a reciprocal piston element 62 operatively connected to the shift lever 16 by a rod 64, the latter being connected to the shift lever by a universal connection 66. A spring 68, connected to the dash of the vehicle, serves to bias the actuator and its connected shift lever to the right to insure either a second or high gear operation of the lever unless the spring is overcome by manually moving the lever to the left preparatory to shifting the same to either of its low or reverse gear positions.

The actuator is preferably vacuum operated, the air transmitting conduit 54 interconnecting the actuator control valve 56 with the clutch control mechanism as previously described. The valve 56 is two-way or reciprocally operated by a treadle 70 and connecting linkage 72 and provides in effect two separate three-way valves. The valve structure preferably comprises a reciprocable piston 74 recessed at 76 opposite a vacuum port 77 in a casing 78, said piston being provided with openings 80 interconnecting a longitudinally extending bore 82 in the piston with atmospheric vent ports 84 in the casing 78. The casing is provided with ports 86 and 88 connected by conduits 90 and 92 respectively to the ends of the actuator. Valve springs 94 serve to return the piston 74 to a neutral position to vent both ends of the actuator to atmosphere and close off the vacuum port 77 when the treadle is released.

In operation, depression of the toe portion of the treadle 70 serves to move the piston 74 to the left, Figure 2, to evacuate the forward compartment 96 of the actuator by way of conduit 90, port 86, recess port 77 and conduit 54, atmosphere being admitted to the rear compartment 98 of the actuator by way of ports 84, openings 80, bore 82, port 88 and conduit 92. The actuator is thus energized to move the shift lever forward to its second gear position, the lever remaining in this position when the treadle is released to vent both ends of the actuator. A heel operation of the treadle serves to move the piston 74 to the right, Figure 2, to evacuate the rear compartment 98 of the actuator by way of conduit 92, port 88, recess 76 and conduit 54, atmosphere being admitted to the forward compartment 96 of the actuator by way of ports 84 and 86 and conduit 90. The actuator is thus energized to move the shift lever to its high gear position.

When it is desired to shift into either low or reverse gear, the shift lever is manually swung to the left through the gate in the transmission, overcoming spring 68, whereupon the lever may again be selectively power operated. If desired, the lever may be manually operated to shift into either low or reverse, and it is also apparent that the lever may be completely manually operated, the venting of both ends of the actuator to atmosphere insuring an unimpeded movement of the actuator piston 62.

There is thus provided a simple form of power mechanism for operating the shift lever of a conventional automotive vehicle, the mechanism being easily installed as an accessory unit. The heel and toe operation of the treadle requires but a minimum of physical and mental effort and in combination with the vacuum operated clutch, which dispenses with the operation of the clutch pedal, there is provided a mechanism of obvious utility; furthermore, with the suggested atmospheric suspended actuator the driver may ignore the power mechanism and operate the shift lever manually in a conventional fashion.

It will be understood that while the illustrated embodiments of the invention are described as shown, a considerable latitude is to be permitted in construction within the scope of the appended claims.

I claim:

1. In an automotive vehicle provided with an engine, a clutch, a drive shaft and a selective gear transmission interconnecting said clutch and shaft, engine operated vacuum power means for controlling the operation of the clutch and transmission including a distributor for controlling the operation of the transmission by said power means, and a manually operable element for jointly controlling the power operation of both the clutch and transmission, said power means comprising a pressure differential operated motor operatively connected to said transmission, means normally operative to bias said motor to a position to insure either a second or high gear operation of said transmission, and means operative to overcome said biasing means to permit of either a low or reverse gear operation of the transmission.

2. In an automotive vehicle provided with an engine, a clutch, a drive shaft and a selective gear transmission interconnecting said clutch and shaft, vacuum operated power means for controlling the operation of the clutch and transmission, a manually-operable distributor for controlling the mode of operation of said power means to operate the transmission, and a manually-operable element for jointly controlling the operation of both the clutch and transmission, said power means comprising a double-acting, fluid operated motor operatively connected to said transmission, means normally operative to bias said motor bodily to a position to insure either a second or high gear operation of said transmission, and manually-operative means to overcome said biasing means to permit of either a low or reverse gear operation of the transmission.

3. In an automotive vehicle provided with an engine, a clutch, a drive shaft and a standard selective gear transmission interconnecting said clutch and shaft and including a shift lever, pressure differential-operated means for operating said transmission, means for controlling the operation of said pressure differential-operated means to select the gear ratio desired, said pressure differential-operated means comprising a double-acting, double-ended, pressure differential-operated motor operatively connected with said shift lever and pivotally mounted to be bodily swivelled in a horizontal plane, a compression spring operative in a horizontal plane to normally maintain said fluid motor in such position as to insure a second or high gear operation of the transmission, and means selectively operable at the will of the driver and operative to overcome said spring to bodily swivel said motor to a position to insure either a low or reverse gear operation of the transmission.

4. A power operated accessory unit for operating a shift lever of an automotive vehicle comprising a double-acting vacuum operated actuator operably connected to the lever and pivotally mounted on the dash of the vehicle, valve mechanism for controlling the operation of said actuator, and a foot-operated treadle member for operating said valve mechanism.

5. A power operated accessory unit for operating the shift lever of an automotive vehicle comprising a double-acting vacuum operated actuator operably connected to the lever and pivotally mounted on the dash of the vehicle, valve means for controlling the operation of said motor, said valve mechanism comprising a ported casing member and a reciprocable piston slidable within said casing, said casing and piston being constructed to provide two three-way valve members, and a foot-operated treadle member for operating said valve piston member.

6. In an automotive vehicle provided with a transmission having a shift lever, power operated means for operating said lever to select either a second or high gear setting of the transmission, said power means comprising a double-acting vacuum operated actuator operably connected to the shift lever within the driver's compartment of the vehicle, a spring acting to bias said actuator and its connected shift lever to a position to insure either of the aforementioned settings of the transmission, and valve means for selectively controlling the operation of the actuator.

7. In an automotive vehicle provided with a transmission having a shift lever, power operated means for operating said lever to select either a second or high gear setting of the transmission, said power means comprising a double-acting vacuum operated actuator operably connected to the shift lever within the driver's compartment of the vehicle, a spring acting to bias said actuator and its connected shift lever to a position to insure either a second or a high gear operation of the transmission, three-way valve means for selectively controlling the operation of the actuator, and a heel and toe operated treadle member operably connected to said valve mechanism.

ROBERT P. BREESE.